US010177355B2

United States Patent
Ogawa

(10) Patent No.: US 10,177,355 B2
(45) Date of Patent: Jan. 8, 2019

(54) BATTERY PACK

(71) Applicant: FDK CORPORATION, Tokyo (JP)

(72) Inventor: Yusuke Ogawa, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 15/562,864

(22) PCT Filed: Jan. 5, 2016

(86) PCT No.: PCT/JP2016/050084
§ 371 (c)(1),
(2) Date: Sep. 28, 2017

(87) PCT Pub. No.: WO2016/157919
PCT Pub. Date: Oct. 6, 2016

(65) Prior Publication Data
US 2018/0114959 A1 Apr. 26, 2018

(30) Foreign Application Priority Data
Mar. 31, 2015 (JP) .................................. 2015-071833

(51) Int. Cl.
*H01M 2/10* (2006.01)
(52) U.S. Cl.
CPC ........... *H01M 2/1077* (2013.01); *H01M 2/10* (2013.01); *H01M 2/1022* (2013.01)
(58) Field of Classification Search
CPC combination set(s) only.
See application file for complete search history.

(56) References Cited

U.S. PATENT DOCUMENTS

| 6,523,274 B1 * | 2/2003 | Saito | .................. B60R 16/0239 |
| | | | 180/68.5 |
| 9,728,755 B2 * | 8/2017 | Gunna | ................ H01M 10/625 |
| 2011/0104532 A1 * | 5/2011 | Buck | ...................... F16K 17/16 |
| | | | 429/82 |

(Continued)

FOREIGN PATENT DOCUMENTS

| JP | 2010129860 A | 6/2010 |
| JP | 2011134709 A | 7/2011 |

(Continued)

OTHER PUBLICATIONS

International Search Report dated Feb. 2, 2016, for corresponding PCT Application No. PCT/JP2016/050084.

*Primary Examiner* — Kaity V Chandler
(74) *Attorney, Agent, or Firm* — Kinney & Lange, P.A.

(57) ABSTRACT

A battery pack includes a first frame, a second frame, and assembled batteries. The first frame includes a top edge and a bottom edge. The top edge includes an inner projecting piece, an outer projecting piece distanced from the inner projecting piece, an outer depressed part, and an inner depressed part. The bottom edge includes a center projecting piece that is disposed in a position corresponding to a gap between the inner projecting piece and the outer projecting piece when the bottom edge is engaged with the top edge of another first frame and that has a thickness fitting this gap, and an outer engagement projection and an inner engagement projection provided in positions corresponding to the outer depressed part and the inner depressed part.

4 Claims, 10 Drawing Sheets

(56) References Cited

U.S. PATENT DOCUMENTS

| | | | |
|---|---|---|---|
| 2011/0151311 A1* | 6/2011 | Lee | H01M 2/1077 429/156 |
| 2013/0273398 A1* | 10/2013 | Hoshi | H01M 2/1077 429/61 |
| 2016/0036019 A1* | 2/2016 | Gunna | H01M 10/6551 429/50 |
| 2016/0036020 A1* | 2/2016 | Gunna | H01M 10/625 429/99 |
| 2016/0133904 A1* | 5/2016 | Ogawa | H01M 2/1077 429/156 |
| 2016/0218332 A1* | 7/2016 | Baek | H01M 2/1077 |
| 2017/0338454 A1* | 11/2017 | Millon | H01M 10/613 |
| 2018/0013111 A1* | 1/2018 | Wuensche | H01M 10/613 |
| 2018/0013113 A1* | 1/2018 | Wuensche | H01M 2/1077 |
| 2018/0114959 A1* | 4/2018 | Ogawa | H01M 2/1022 |

FOREIGN PATENT DOCUMENTS

| | | |
|---|---|---|
| JP | 3172086 U | 12/2011 |
| JP | 2014232679 A | 12/2012 |
| JP | 201475283 A | 4/2014 |
| WO | 2012173233 A1 | 12/2012 |

* cited by examiner

BATTERY PACK

BACKGROUND

Technical Field

The present disclosure relates to a battery pack.

Background Art

A battery pack is a device in which a large number of batteries are connected in parallel or series and which can provide a predetermined voltage and capacity and has a wide range of uses, e.g., as a backup power source in electrical equipment. In this battery pack, each battery is, for fixation, contained in a case or sandwiched between a pair of frames. Such battery packs are combined according to the intended use and used as a battery pack assembly. In this battery pack assembly, multiple battery packs are stacked with a spacer therebetween as shown in Patent Document 1, for example.

PRIOR ART DOCUMENT

Patent Document

Patent Document 1: International Publication No. WO2012/073415

SUMMARY

Problems to be Solved

In a battery pack assembly represented by that disclosed in Patent Document 1, a spacer is disposed between battery packs as a dedicated part. This spacer is secured to a joint member mounted to each battery pack by screws and disposed in a predetermined position. Manufacturing such a battery pack assembly yields low manufacturing efficiency because it involves a large component count and requires a step of securement by screws.

An object of the present disclosure, which has been made in the above-described background, is to provide a battery pack with which a battery pack assembly can be fabricated with a reduced component count and assembly man-hour count.

Means for Solving the Problems

A battery pack of the present disclosure includes: a plate-like first frame; a plate-like second frame; and multiple batteries held between the first frame and the second frame. The first frame includes a first top edge positioned in a top portion and a first bottom edge positioned in a bottom portion. The first top edge includes a first inner projecting piece that is adjacent to the batteries and projects upward, a first outer projecting piece that is distanced from the first inner projecting piece in the opposite direction from the batteries and projects upward, and a first depressed part that is depressed from a base of the first inner projecting piece and the first outer projecting piece. The first bottom edge includes a first center projecting piece that projects downward from a position corresponding to a gap between the first inner projecting piece and the first outer projecting piece when the first bottom edge is engaged with the first top edge of another first frame and that has a thickness fitting the gap, and a first engagement projection that is provided in a position corresponding to the first depressed part.

According to the present disclosure, when battery packs are stacked on each other, the first bottom edge of the first frame of the upper battery pack is engaged with the first top edge of the first frame of the lower battery pack. Here, the first center projecting piece is provided in a position corresponding to the gap between the first inner projecting piece and the first outer projecting piece and has a thickness fitting this gap and therefore is fitted between the first inner projecting piece and the first outer projecting piece of the first top edge. In addition, the first engagement projection of the first bottom edge is fitted in the first depressed part of the first top edge. This prevents the upper first frame and the lower first frame from displacing vertically, back and forth, and from side to side.

It is preferable that the first inner projecting piece and the first outer projecting piece be displaced from each other in the longitudinal direction, and the first center projecting piece be disposed in a position to be in contact with both the first inner projecting piece and the first outer projecting piece.

With this structure, each projecting piece only has to be provided only in a needed portion, so that a raw material for the first frame can be saved, which contributes to reductions in the weight and manufacturing cost of the battery pack.

It is preferable that the second frame include a second top edge positioned in a top portion and a second bottom edge positioned in a bottom portion, the second top edge include a second inner projecting piece that is adjacent to the batteries and projects upward, a second outer projecting piece that is distanced from the second inner projecting piece in the opposite direction from the batteries and projects upward, and a second depressed part that is depressed from a base of the second inner projecting piece and the second outer projecting piece, and the second bottom edge include a second center projecting piece that projects downward from a position corresponding to a gap between the second inner projecting piece and the second outer projecting piece when the second bottom edge is engaged with the second top edge of another second frame and that has a thickness fitting the gap, and a second engagement projection that is provided in a position corresponding to the second depressed part.

With this structure, when battery packs are stacked on each other, the second bottom edge of the second frame of the upper battery pack is engaged with the second top edge of the second frame of the lower battery pack. Here, the second center projecting piece is provided in a position corresponding to the gap between the second inner projecting piece and the second outer projecting piece and has a thickness fitting this gap and therefore is fitted between the second inner projecting piece and the second outer projecting piece of the second top edge. In addition, the second engagement projection of the second bottom edge is fitted to the second depressed part of the second top edge. This prevents the upper second frame and the lower second frame from displacing vertically, back and forth, and from side to side.

It is preferable that the second inner projecting piece and the second outer projecting piece be displaced from each other in the longitudinal direction, and the second center projecting piece be disposed in a position to be in contact with both the second inner projecting piece and the second outer projecting piece.

With this structure, each projecting piece only has to be provided only in a needed portion, so that a raw material for the second frame can be saved, which contributes to reductions in the weight and manufacturing cost of the battery pack.

As described above, when multiple battery packs according to the present disclosure are stacked on each other, they can be stably stacked without a dedicated component or securement by screws. Accordingly, use of the battery packs according to the present disclosure allows a battery pack assembly to be easily obtained.

Advantageous Effects

According to the present disclosure, a battery pack can be provided with which a battery pack assembly can be fabricated with a reduced component count and assembly man-hour count.

DETAILED DESCRIPTION

A battery pack assembly 4 using battery packs 2 according to the present disclosure will now be described with reference to the drawings.

Figure 1:
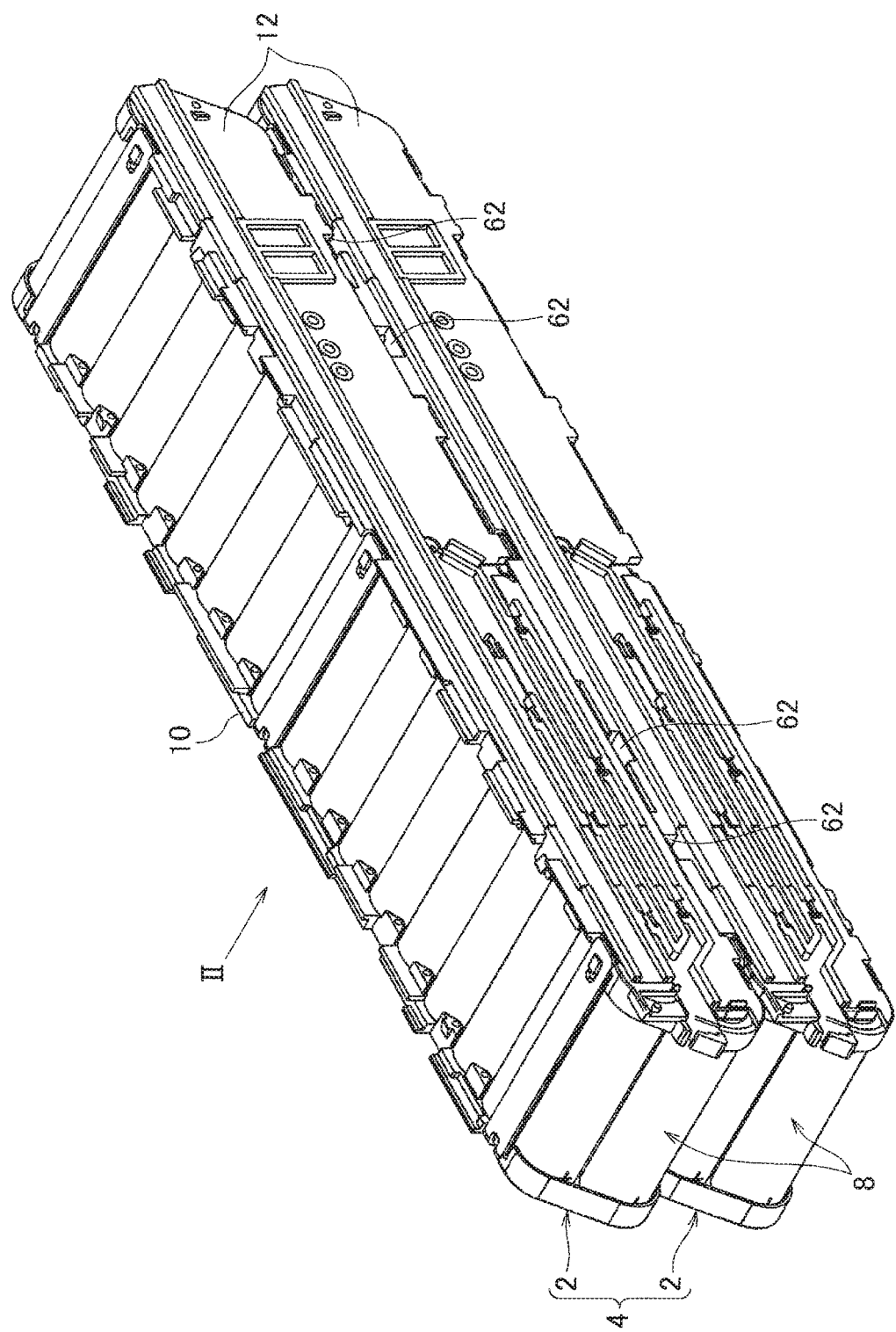
FIG. 1 is a perspective view showing a battery pack assembly according to one embodiment of the present disclosure.

As shown in FIG. 1, the battery pack assembly 4 includes two stacked battery packs 2.

This battery pack assembly 4 is accommodated in an accommodation space in electrical equipment. An accommodation space usually contains a predetermined area of bottom surface, a support disposed in a predetermined position on this bottom surface, and a retainer plate mounted to this support. The battery pack assembly 4 is placed on the bottom surface in the accommodation space and fixed by the retainer plate pushing it from above.

Figure 2:
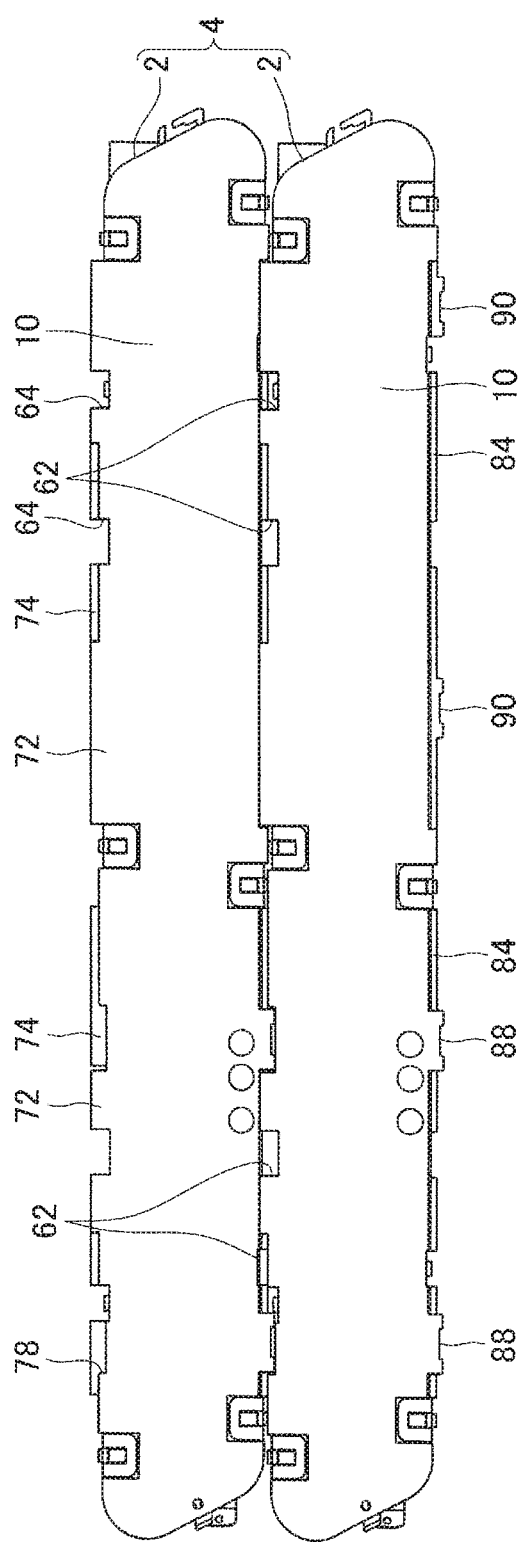
FIG. 2 is a side view showing a side surface of the battery pack assembly viewed in the direction of the arrow II in FIG. 1.

It should be noted that, in the battery pack assembly 4, member-passing holes 62 through which various members such as a fixing member or a lead (neither is shown in the drawing) can pass are provided in predetermined positions between the upper battery pack 2 and the lower battery pack 2 as shown in FIGS. 1 and 2.

One embodiment of the battery pack 2 will now be described.

Figure 3:
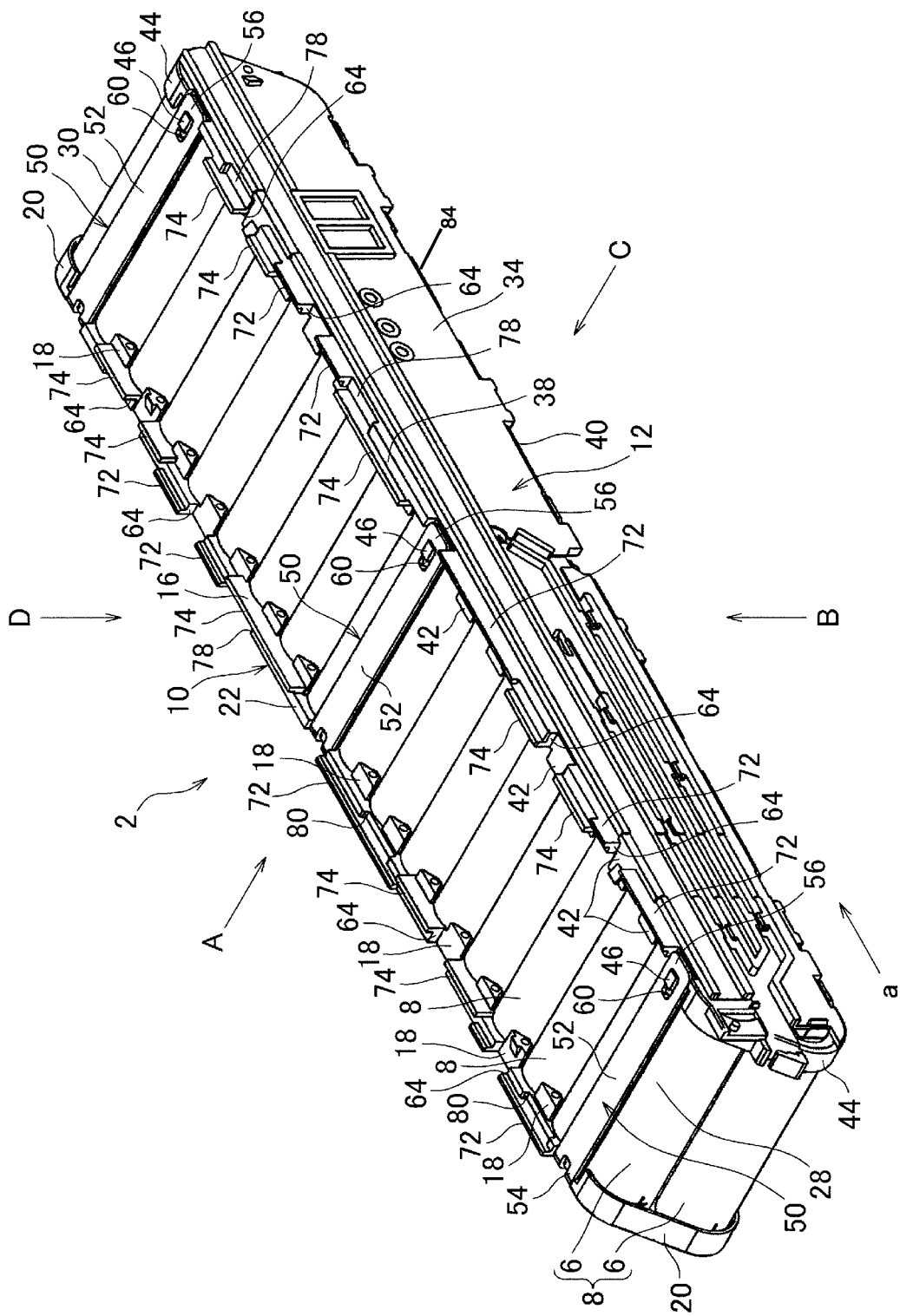
FIG. 3 is a perspective view showing a battery pack according to one embodiment of the present disclosure.

As shown in FIG. 3, in the battery pack 2, multiple assembled batteries 8 are arranged between a first frame 10 and a second frame 12 and sandwiched between the first frame 10 and the second frame 12.

Each assembled battery 8 consists of a pair of general-purpose nickel metal hydride secondary batteries (hereinafter referred to as unit batteries 6) arranged in parallel to be one piece. These unit batteries 6 are arranged such that their positive terminals and negative terminals are positioned on the opposite sides: the negative terminal of one unit battery 6 and the positive terminal of the other unit battery 6 are electrically series-connected to each other through a lead, which is not shown in the drawing. Further, the assembled batteries 8 are electrically series-connected to each other through a lead, which is not shown in the drawing. Eighteen assembled batteries 8 are prepared to make up a group of assembled batteries 8. Here, as is clear from FIG. 3, each assembled battery 8 is disposed at a slight inclination to the direction of the arrow a which is parallel with the longitudinal direction of the battery pack 2. These assembled batteries 8 are sandwiched and held between the first frame 10 and the second frame 12.

Figure 4:
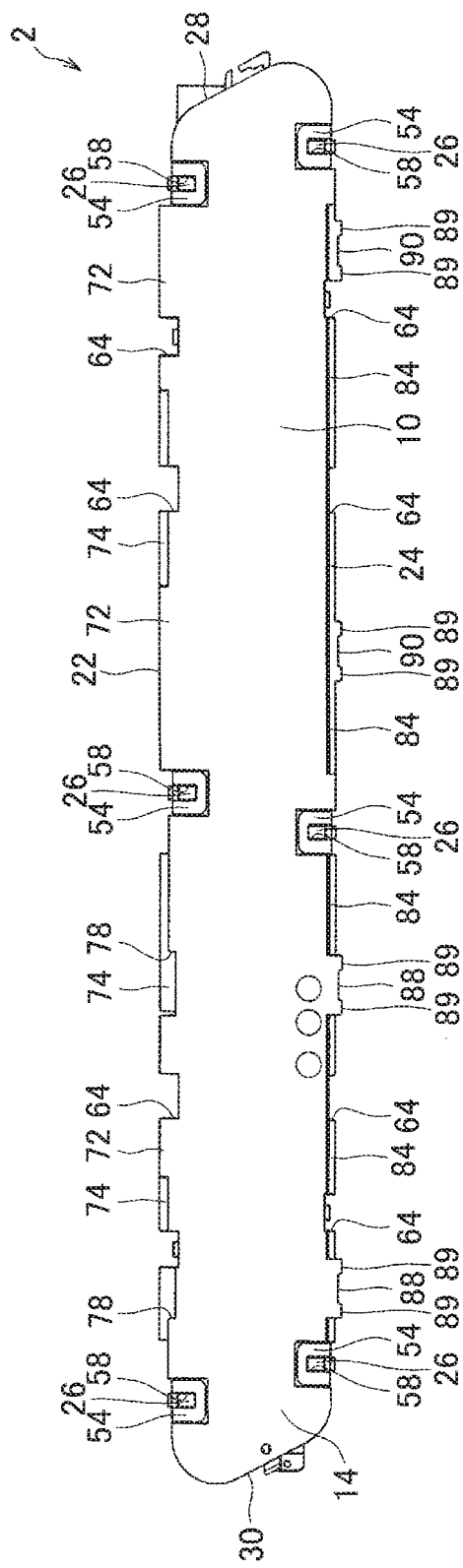
FIG. 4 is a side view of the battery pack viewed in the direction of the arrow A in FIG. 3.
Figure 5:
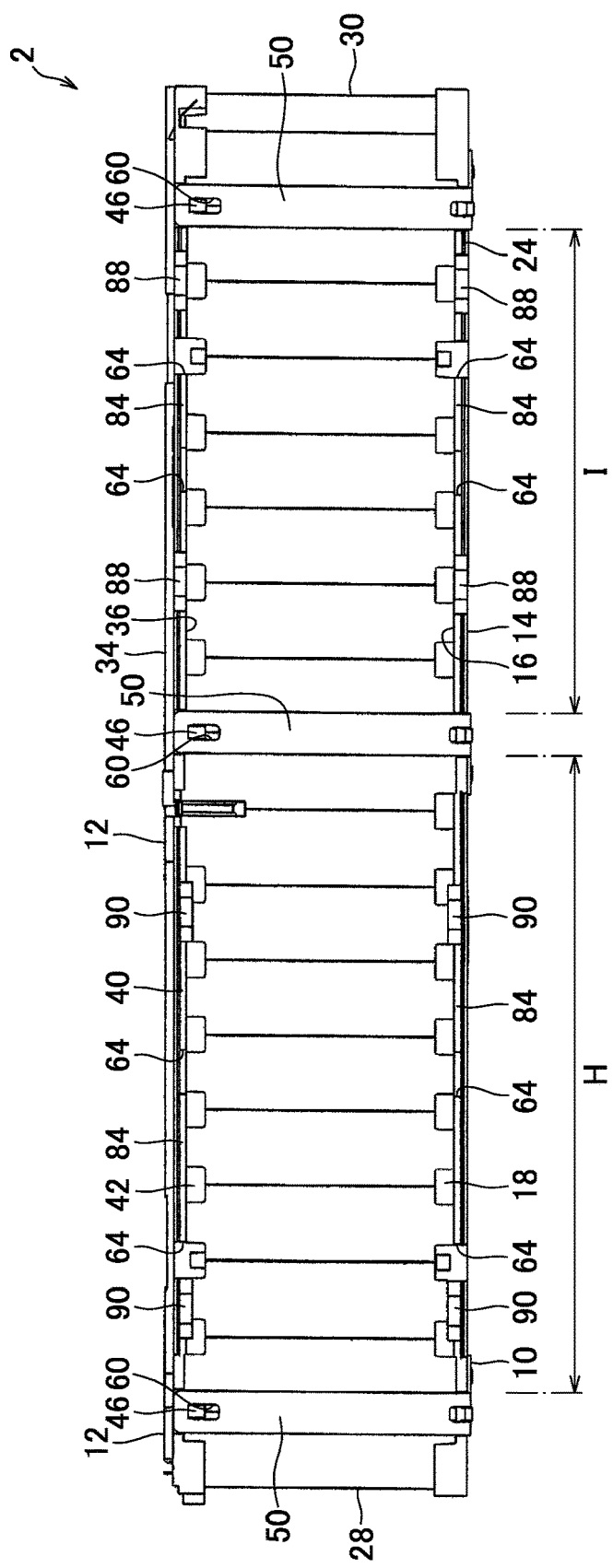
FIG. 5 is a bottom view of the battery pack viewed in the direction of the arrow B in FIG. 3.

In FIG. 3, the first frame 10 is on the left side of the group of assembled batteries 8. This first frame 10 is a resin plate having a generally parallelogram shape in a plane view, as shown in FIG. 4 which is a side view in the direction of the arrow A in FIG. 3. Here, the surface shown in FIG. 4 is referred to as an outside surface 14, and the surface opposite from the outside surface 14 and adjacent to the assembled batteries 8 is referred to as an inside surface 16. In addition, the top edge of the first frame 10 denoted by the reference numeral 22 in FIG. 3 is referred to as a top edge 22. The bottom edge opposite from the top edge 22, i.e., the edge denoted by the reference numeral 24 in FIG. 5 showing the bottom of the battery pack 2 in the direction of the arrow B in FIG. 3 is referred to as a bottom edge 24.

As is clear from FIG. 3, multiple retainer projections 18 with generally triangle cross sections are provided in predetermined positions on the inside surface 16 of this first frame 10 which is adjacent to the assembled batteries 8. These retainer projections 18 are disposed in predetermined positions between the assembled batteries 8 and have such shapes that their portions to come in contact with the assembled batteries 8 fit parts of the outer regions of the assembled batteries 8, so that these assembled batteries 8 suppress the vertical displacement of the battery pack 2. Further, as is clear from FIG. 3, edge stoppers 20 are formed at the longitudinal edges of the first frame 10. These edge stoppers 20 are frames having shapes that fit parts of the outer regions of the assembled batteries 8, and act to suppress the back and forth displacement of the assembled batteries 8 disposed at the front and back edges of the battery pack 2.

Further, multiple first fixer projections 26 designed to be engaged with fixer plates 50, which will be described later, are provided in predetermined positions on the outside surface 14 of the first frame 10. To be specific, as is clear from FIG. 4, the first fixer projections 26 are provided in a total of six portions including three portions just below the top edge 22 of the outside surface 14: a portion adjacent to one end 28 (on the right side in FIG. 4) of the battery pack 2, a portion adjacent to the other end 30 (on the left side in FIG. 4) of the battery pack 2, and a generally middle portion between the one end 28 and the other end 30; and three portions just above the bottom edge 24 of the outside surface 14: a portion adjacent to the one end 28 (on the right side in FIG. 4) of the battery pack 2, a portion adjacent to the other end 30 (on the left side in FIG. 4) of the battery pack 2, and the generally middle portion between the one end 28 and the other end 30.

Figure 6:
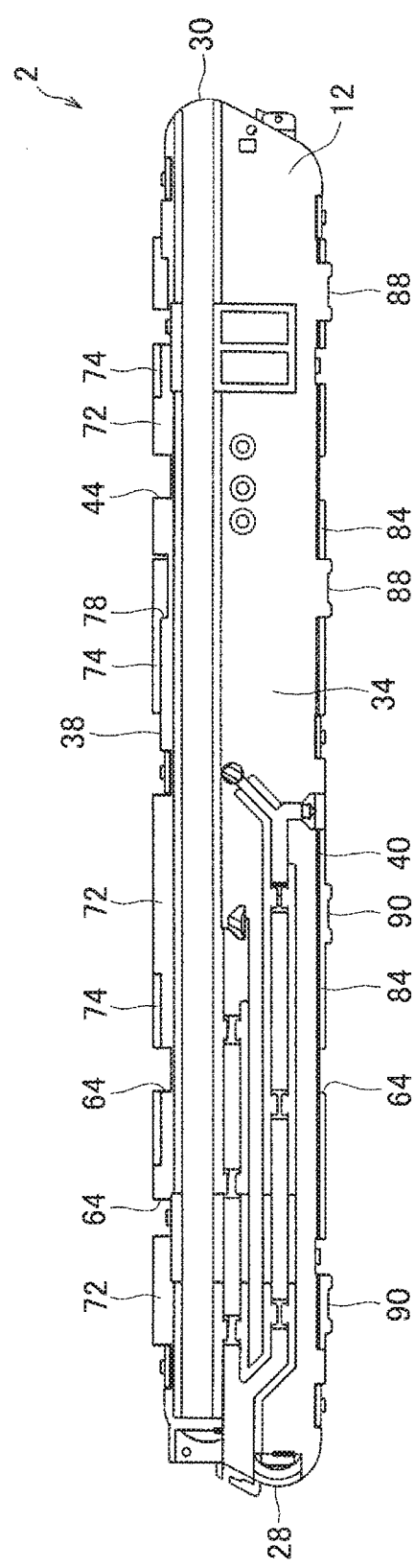
FIG. 6 is a side view of the battery pack viewed in the direction of the arrow C in FIG. 3.

The second frame 12 is present on the right side of the group of assembled batteries 8 in FIG. 3. This second frame 12 is a resin plate having a generally parallelogram shape in a plane view, as shown in FIG. 6 which is a side view along the direction of the arrow C in FIG. 3. Here, the surface shown in FIG. 6 is referred to as an outside surface 34, and the surface opposite from the outside surface 34 and adjacent to the assembled batteries 8 is referred to as an inside surface 36. In addition, the top edge of the second frame 12 denoted by the reference numeral 38 in FIG. 3 is referred to as a top edge 38. The bottom edge opposite from the top edge 38, i.e., the edge denoted by the reference numeral 40 in FIG. 5 which is a plane view showing the bottom of the battery pack 2 from the direction of the arrow B in FIG. 3 is referred to as a bottom edge 40.

Like the first frame 10, this second frame 12 is provided with retainer projections 42 and edge stoppers 44. The retainer projections 42 of the second frame 12 have the same shape as the retainer projections 18 of the first frame 10 and are disposed in the positions opposite to the retainer projections 18 of the first frame 10. Similarly, the edge stoppers 44 of the second frame 12 have the same shape as the edge stoppers 20 of the first frame 10 and are disposed in the positions opposite to the edge stoppers 20 of the first frame 10.

Multiple second fixer projections 46 designed to be engaged with fixer plates 50, which will be described later, are provided in predetermined positions of second frame 12. To be specific, as is clear from FIG. 3, the second fixer projections 46 at the upper edge of the battery pack 2 are provided in three portions: above the retainer projection 42 in a portion adjacent to the one end 28 of the battery pack 2, above the retainer projection 42 in a portion adjacent to the other end 30 of the battery pack 2, and above the retainer projection 42 in a generally middle portion between the one end 28 and the other end 30. Further, as is clear from FIG. 5, the second fixer projections 46 at the lower edge of the battery pack 2 are provided in three portions: above the retainer projection 42 in a portion adjacent to the one end 28 of the battery pack 2, above the retainer projection 42 in a portion adjacent to the other end 30 of the battery pack 2, and above the retainer projection 42 in a generally middle portion between the one end 28 and the other end 30. A total of six second fixer projections 46 on the second frame 12 side are provided in predetermined portions corresponding to the first fixer projections 26 on the first frame 10 side.

The above-described first frame 10 and second frame 12 are opposite to each other, so that their retainer projections 18 and 42 and the edge stoppers 20 and 44 are disposed in corresponding positions. Accordingly, the retainer projections 18 and the edge stoppers 20 of the first frame 10 and the retainer projections 42 and the edge stoppers 44 of the second frame 12 determine the positions of the assembled batteries 8 in cooperation with each other.

Figure 7:
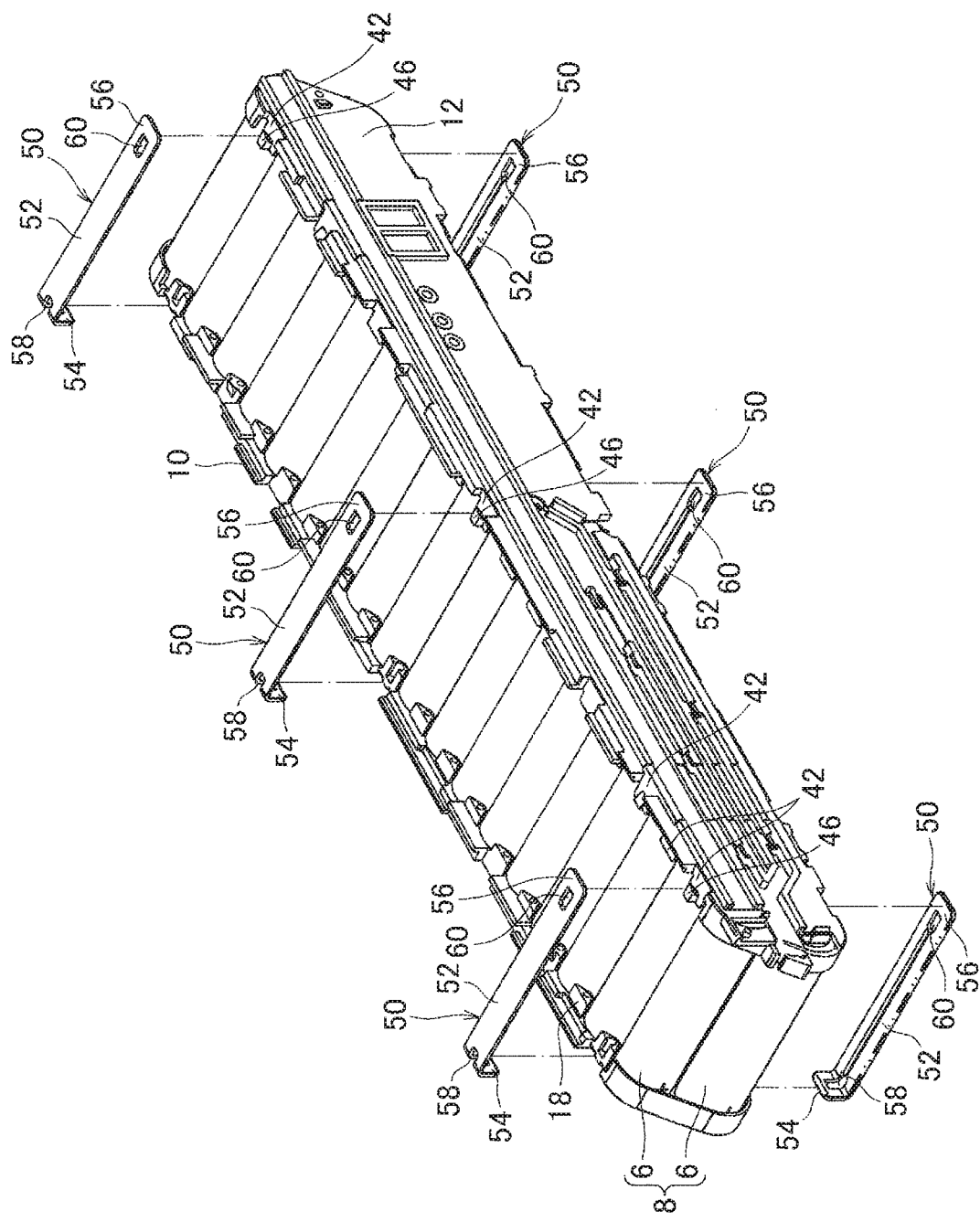
FIG. 7 is a perspective view showing the state where fixer plates are removed from the battery pack.

The first frame 10 and the second frame 12 in which the assembled battery 8 is disposed in a predetermined position as described above are coupled with each other with the fixer plates 50. As shown in FIG. 7, each fixer plate 50 is a long slender strip including a body part 52 having a longitudinal length approximately equal to that of each assembled battery 8, and a bent end 54 which is one end of the body part 52 bent into an L shape. The bent end 54 and the other end 56 of the body part 52 are provided with a long hole. Here, the long hole in the bent end 54 is referred to as a first long hole 58, and the long hole in the other end 56 of the body part 52 is referred to as a second long hole 60.

As shown in FIG. 3, the fixer plates 50 are provided across the first frame 10 and the second frame 12 in three predetermined portions at the upper edge of the battery pack 2. Further, as shown in FIG. 5, the fixer plates 50 are provided across the first frame 10 and the second frame 12 in three predetermined portions at the lower edge of the battery pack 2. For each fixer plate 50, the first long hole 58 in the bent end 54 is engaged with the first fixer projection 26 provided on the outside surface 14 of the first frame 10 (see FIG. 4), and the second long hole 60 in the body part 52 is engaged with the second fixer projection 46 of the second frame 12 (see FIGS. 3 and 5). Accordingly, the first frame 10 and the second frame 12 are pulled toward each other, holding the assembled batteries 8 therebetween. Thus, the battery pack 2 is formed.

Battery packs 2 formed in this manner are stacked, forming the battery pack assembly 4. In the battery packs 2 of the present disclosure, without use of a dedicated component, the top edge 22 of the first frame 10 of the lower battery pack 2 and the bottom edge 24 of the first frame 10 of the upper battery pack 2 can be engaged with each other, and the top edge 38 of the second frame 12 of the lower battery pack 2 and the bottom edge 40 of the second frame 12 of the upper battery pack 2 can be engaged with each other. The structures of the top edges 22 and 38 and the bottom edges 24 and 40 of the first frame 10 and the second frame 12 will now be described. Since the structures of the top edge 22 and the bottom edge 24 of the first frame 10 and the structures of the top edge 38 and the bottom edge 40 of the second frame 12 are symmetrically placed right and left, the corresponding portions are denoted by the same reference numerals and only the first frame 10 will be described, omitting the description of the second frame 12.

Figure 8:
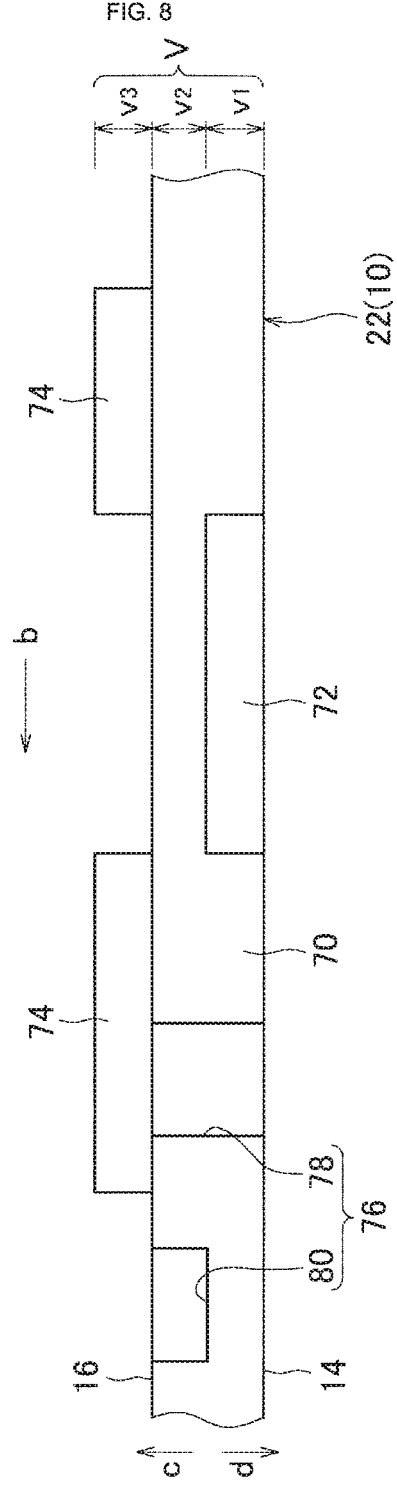
FIG. 8 is a schematic enlarged plane structural view showing a part of the top edge.

First, the basic structure of the top edge 22 will be described with reference to FIG. 8 which is an enlarged schematic structure view of a part of the plane view of the top edge 22. In FIG. 8, the arrow b indicates the longitudinal direction of the first frame 10, and the assembled batteries 8 lie in the direction of the arrow c, and the arrow d indicates the outward direction from the battery pack 2.

The top edge 22 of the first frame 10 has a predetermined width V and extends in the longitudinal direction of the first frame 10. Here, assume that the width V of the top edge 22 is divided into three widths and there are three areas having these widths and extending in the longitudinal direction.

A first area v1 is adjacent to the outside surface 14 of the first frame 10. A second area v2 is next to the first area v1. A third area v3 is next to the second area v2. Here, the third area v3 is away from the first area v1 by the distance corresponding to the width of the second area v2.

In the first area v1, outer projecting pieces 72 projecting from the base surface 70 of the top edge 22 are provided in the direction of the arrow b in a predetermined range of length.

In the third area v3, inner projecting pieces 74 projecting from the base surface 70 of the top edge 22 are provided in the direction of the arrow b in a predetermined range of length. At the top edge 22, no projecting piece is formed in the second area v2.

Thus, a gap having the width of the second area v2 exists between the outer projecting piece 72 and the inner projecting piece 74. In particular, the outer projecting piece 72 is away from the inner projecting piece 74 by the width of the second area v2.

Here, the lengths of the outer projecting pieces 72 and the inner projecting pieces 74 in the direction of the arrow b can be freely determined. The inner projecting pieces 74 and the outer projecting pieces 72 can exist along all the longitudinal length of the top edge 22. However, to form the outer projecting pieces 72 and the inner projecting pieces 74 only in needed portions for the reason of, for example, savings of raw materials, their lengths in the direction of the arrow b are preferably adjusted such that they are displaced with respect to each other in the longitudinal direction as shown in FIG. 8.

Further, at the top edge 22, depressed parts 76 are provided which are depressed from the base surface 70 serving as the base of the outer projecting pieces 72 and the inner projecting pieces 74. As is clear from FIG. 8, the depressed parts 76 include outer depressed parts 78 formed in the first area v1 and the second area v2 and opened toward the outside surface 14, and inner depressed parts 80 formed only in the second area v2 and opened toward the inside surface 16.

Figure 9:
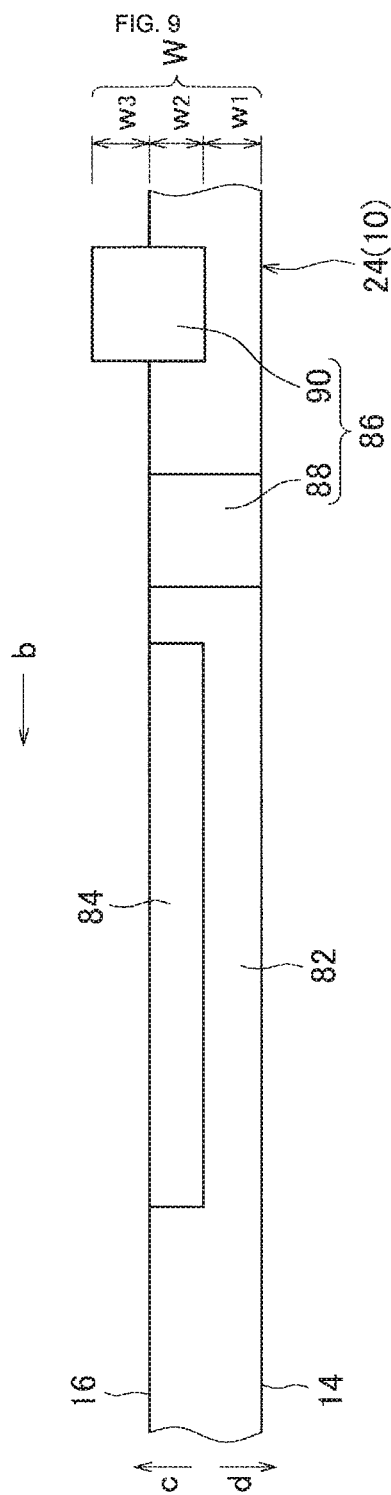
FIG. 9 is a schematic enlarged plane structural view showing a part of the bottom edge.

Next, the basic structure of the bottom edge 24 will be described with reference to FIG. 9 which is an enlarged schematic structure view of a part of the plane view of the bottom edge 24. In FIG. 9, the arrow b indicates the longitudinal direction of the first frame, and the assembled batteries 8 lie in the direction of the arrow c, and the arrow d indicates the outward direction from the battery pack 2.

The bottom edge 24 of the first frame 10 has a predetermined width W and extends in the longitudinal direction of the first frame 10. Assume that the width W of the bottom edge 24 is divided into three widths and there are three areas having these widths and extending in the longitudinal direction.

A first area w1 is adjacent to the outside surface 14 of the first frame 10. A second area w2 is next to the first area w1. A third area w3 is next to the second area w2.

The widths of the first area w1, the second area w2, and the third area w3 at the bottom edge 24 are equal to the respective widths of the first area v1, the second area v2, and the third area v3 at the top edge 22 shown in FIG. 8.

At the bottom edge 24, no projecting piece exists in the first area w1 and the third area w3.

In the second area w2, a center projecting piece 84 projecting from the base surface 82 of the bottom edge 24 is provided in the direction of the arrow b in a predetermined range of length.

As described above, the width of the second area w2 at the bottom edge 24 corresponding to the thickness of the center projecting piece 84 is equal to the width of the second area v2 at the top edge 22 corresponding to the above-described length between the inner projecting piece 74 and the outer projecting piece 72 in the width direction. Accordingly, the center projecting piece 84 has a thickness equal to the size of the gap between the inner projecting piece 74 and the outer projecting piece 72.

The length of the center projecting pieces 84 in the direction of the arrow b can be freely determined. Here, the length of the center projecting piece 84 in the direction of the arrow b is preferably adjusted such that each center projecting piece 84 is in contact with both the inner projecting piece 74 and the outer projecting piece 72 when the bottom edge 24 and the top edge 22 are assembled.

At the bottom edge 24, engagement projections 86 are also provided which are engaged with the depressed parts 76 upon assembly with the top edge 22. As is clear from FIG. 9, the engagement projections 86 include outer engagement projections 88 formed in the first area w1 and the second area w2, and inner engagement projections 90 formed in the second area w2 and the third area w3.

Here, when the top edge 22 of the first frame in FIG. 8 related to one battery pack 2 and the bottom edge 24 of the first frame 10 in FIG. 9 related to the other battery pack are engaged with each other, each center projecting piece 84 is fitted between the outer projecting piece 72 and the inner projecting piece 74. Further, the outer engagement projection 88 is engaged with the outer depressed part 78 and the inner engagement projection 90 is engaged with the inner depressed part 80.

In the battery pack 2 of this embodiment, the above-described basic structure is used in multiple portions. The details will now be explained.

Figure 10:
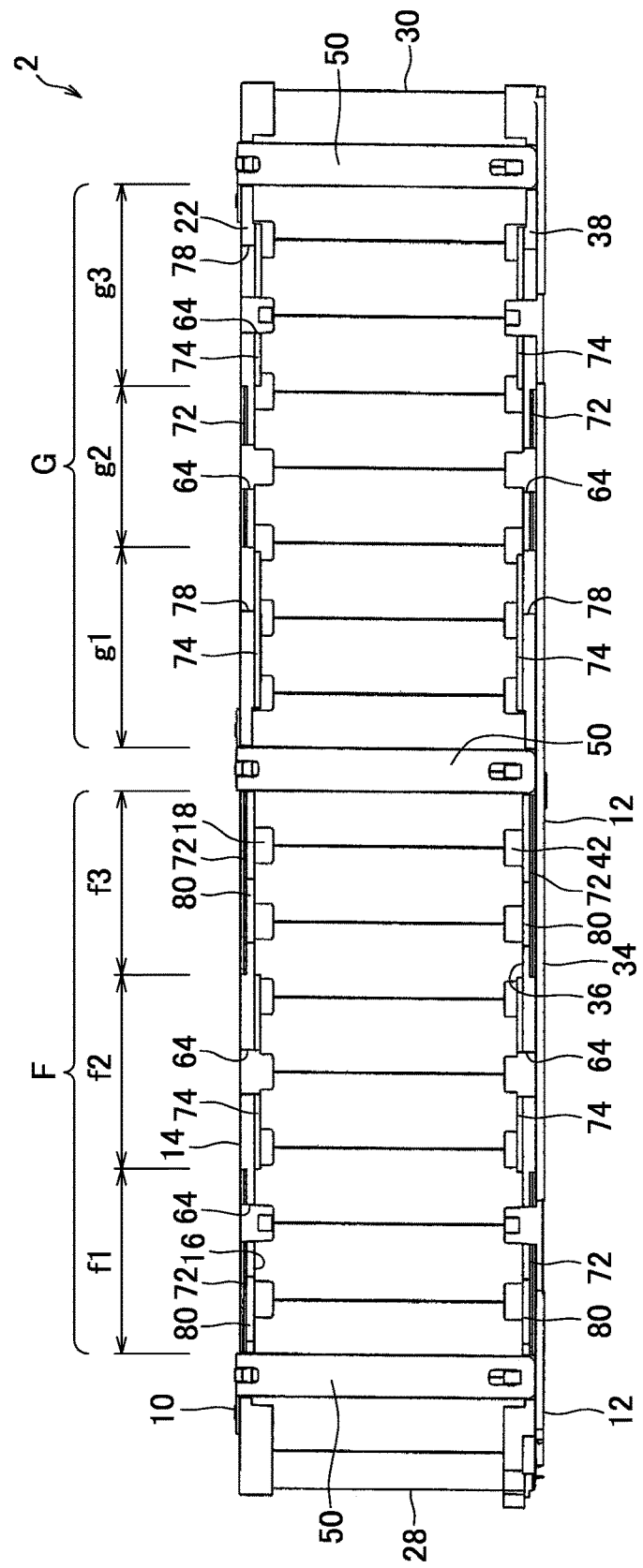
FIG. 10 is a top view of the battery pack viewed in the direction of the arrow D in FIG. 3.

In FIG. 10 which is a plane view from above the battery pack 2 in the direction of the arrow D in FIG. 3, the side of one end 28 is the front side of the battery pack 2, and the side of the other end 30 is the back side of the battery pack 2. The area between the fixer plate 50 on the front side and the fixer plate 50 in the middle is referred to as a front-half area F, and the area between the fixer plate 50 in the middle and the fixer plate 50 on the back side is referred to as a back-half area G. In addition, the front-half area F is divided into three areas which are referred to as, in sequence from the front side, a front side first area f1, a front side second area f2, and a front side third area f3, and the back-half area G is divided into three areas which are referred to as, in sequence from the front side, a back side first area g1, a back side second area g2, and a back side third area g3.

As is clear from FIG. 10, outer projecting pieces 72 are provided in the front side first area f1, the front side third area f3, and the back side second area g2 in the first area v1 at the top edge 22. It should be noted that the outer projecting pieces 72 in the front side first area f1 and the back side second area g2 are chipped in hole formation planned portions 64 which are portions where member-passing holes 62 are planned to be formed.

As is clear from FIG. 10, inner depressed parts 80 are provided in the front side first area f1 and the front side third area f3 in the second area v2 at the top edge 22. Further, outer depressed parts 78 are provided in the back side first area g1 and the back side third area g3 in the first area v1 and the second area v2 at the top edge 22. Here, the inner depressed parts 80 are opened toward the inside surface 16 of the first frame 10. The outer depressed parts 78 are opened toward the outside surface 14 of the first frame 10.

In addition, as is clear from FIG. 10, inner projecting pieces 74 are provided in the front side second area f2, the back side first area g1, and the back side third area g3 in the third area v3 at the top edge 22. It should be noted that the inner projecting pieces 74 in the front side second area f2 and the back side third area g3 are chipped in hole formation planned portions 64 which are portions where member-passing holes 62 are planned to be formed.

Accordingly, at the top edge 22 of the first frame, the outer projecting pieces 72 and the inner projecting pieces 74 are alternately provided with a gap equal to the width of the second area v2, and the outer depressed parts 78 and the inner depressed parts 80 are provided in predetermined positions.

The structure of the bottom edge 24 of the first frame 10 will now be described. In FIG. 5 which shows the battery pack 2 viewed from below, the side of one end 28 is the front side of the battery pack 2, and the side of the other end 30 is the back side of the battery pack 2. The area between the fixer plate 50 on the front side and the fixer plate 50 in the middle is referred to as a front-half area H, and the area between the fixer plate 50 in the middle and the fixer plate 50 on the back side is referred to as a back-half area I.

As is clear from FIG. 5, center projecting pieces 84 are provided in the second area w2 generally throughout the front-half area H and the back-half area I at the bottom edge 24. It should be noted that the center projecting pieces 84 are partially chipped in hole formation planned portions 64 which are portions where member-passing holes 62 are planned to be formed.

In addition, inner engagement projections 90 are provided in the front-half area H in the second area w2 and the third area w3 at the bottom edge 24 of the first frame 10.

Further, outer engagement projections 88 are provided in the back-half area I in the first area w1 and the second area w2 at the bottom edge 24 of the first frame 10.

As is clear from FIG. 4, the outer engagement projections 88 and the inner engagement projections 90 project to a lower level than the edges of the center projecting pieces 84 and each have two projected parts 89 at their lower surfaces.

Further, for the outer engagement projections 88 and the inner engagement projections 90, when the top edge 22 of one first frame 10 is overlaid by the bottom edge 24 of the other first frame, the outer engagement projections 88 are disposed in positions corresponding to the outer depressed parts 78, and the inner engagement projections 90 are disposed in positions corresponding to the inner depressed parts 80.

Since the first frame 10 has the top edge 22 and the bottom edge 24 having the above-described structures, when two battery packs 2 are prepared and stacked on top of each other, the top edge 22 of the first frame 10 of the lower battery pack 2 is engaged with the bottom edge 24 of the first frame 10 of the upper battery pack 2. At this time, the center projecting piece 84 at the bottom edge 24 of the upper first frame 10 is fitted between the alternating outer projecting piece 72 and inner projecting piece 74 at the top edge 22 of the lower first frame 10, and the center projecting piece 84 is held between the outer projecting piece 72 and the inner projecting piece 74. Consequently, the upper first frame 10 and the lower first frame 10 are barely separable in the vertical direction. Further, the outer engagement projections 88 at the bottom edge 24 of the upper first frame are fitted in the outer depressed parts 78 at the top edge 22 of the lower first frame 10, and the inner engagement projections 90 at the bottom edge 24 of the upper first frame is fitted in the inner depressed parts 80 at the top edge 22 of the lower first frame 10. This prevents the upper first frame and the lower first frame from displacing back and forth and from side to side of the battery pack 2.

The second frame 12 has a structure which is a mirror image of the first frame 10, so that the upper second frame 12 and the lower second frame 12 are fitted to each other as in the case of the first frames and are therefore barely separable in the vertical direction, and the upper second frame 12 and the lower second frame 12 are prevented from displacing back and forth and from side to side of the battery pack 2.

Battery packs 2 each including the first frame 10 and the second frame 12 having the above-described structures can be stably stacked without a dedicated component or securement by screws, so that the battery pack assembly 4 can be easily obtained.

The obtained battery pack assembly 4 is accommodated in an accommodation space in electrical equipment. The battery pack assembly 4 is fixed by being pushed from above by a retainer plate mounted to the support on the bottom surface of the accommodation space. The battery pack assembly 4 is accommodated in the electrical equipment in this manner.

Since the battery packs 2 according to the present disclosure can be easily stacked, the battery pack assembly 4 can be easily manufactured and the component count needed for manufacturing the battery pack assembly 4 can be reduced, which contributes to an improvement in the efficiency of manufacturing the battery pack assembly.

Here, if a larger area of the bottom surface of the accommodation space in the electrical equipment can be ensured, a larger number of battery packs 2 can be mounted. For example, an accommodation space which is 448 mm wide, 460 mm deep, and 88.1 mm tall can accommodate six battery pack assemblies 4 each consisting of two battery packs 2 stacked on each other.

In the present disclosure, two battery packs 2 can be easily stacked on each other, so that a power source having capacity twice as much as that provided by a single battery pack can be easily fabricated.

Moreover, although two battery packs 2, 2 are stacked on each other in the description of this embodiment, the present disclosure is not limited to this embodiment. A multiple layer structure consisting of two or more battery packs 2 of the present disclosure is also applicable.

EXPLANATION OF REFERENCE SIGNS 2 battery pack
4 battery pack assembly
6 unit battery
8 assembled battery
10 first frame
12 second frame
22 top edge
24 bottom edge
38 top edge
40 bottom edge
72 outer projecting piece
74 inner projecting piece
78 outer depressed part
80 inner depressed part
84 center projecting piece
88 outer engagement projection
90 inner engagement projection

The invention claimed is:
1. A battery pack comprising:
a plate-like first frame;
a plate-like second frame; and
multiple batteries held between the first frame and the second frame, wherein:
the first frame includes a first top edge positioned in a top portion and a first bottom edge positioned in a bottom portion,
the first top edge includes a first inner projecting piece that is adjacent to the batteries and projects upward, a first outer projecting piece that is distanced from the first inner projecting piece in an opposite direction from the batteries and projects upward, and a first depressed part that is depressed from a base of the first inner projecting piece and the first outer projecting piece, and
the first bottom edge includes a first center projecting piece that projects downward from a position corresponding to a gap between the first inner projecting piece and the first outer projecting piece when the first bottom edge is engaged with the first top edge of another first frame, and that has a thickness fitting the gap, and a first engagement projection that is provided in a position corresponding to the first depressed part.
2. The battery pack according to claim 1, wherein the first inner projecting piece and the first outer projecting piece are displaced from each other in a longitudinal direction, and the first center projecting piece is disposed in a position to be in contact with both the first inner projecting piece and the first outer projecting piece of the first frame of another battery pack.

3. The battery pack according to claim 1, wherein:

the second frame includes a second top edge positioned in a top portion and a second bottom edge positioned in a bottom portion, the second top edge includes a second inner projecting piece that is adjacent to the batteries and projects upward, a second outer projecting piece that is distanced from the second inner projecting piece in the opposite direction from the batteries and projects upward, and a second depressed part that is depressed from a base of the second inner projecting piece and the second outer projecting piece, and the second bottom edge includes a second center projecting piece that projects downward from a position corresponding to a gap between the second inner projecting piece and the second outer projecting piece when the second bottom edge is engaged with the second top edge of another second frame, and that has a thickness fitting the gap, and a second engagement projection that is provided in a position corresponding to the second depressed part.

4. The battery pack according to claim 3, wherein the second inner projecting piece and the second outer projecting piece are displaced from each other in a longitudinal direction, and the second center projecting piece is disposed in a position to be in contact with both the second inner projecting piece and the second outer projecting piece of the second frame of another battery pack.

* * * * *